US009451745B1

(12) United States Patent
O'Shaughnessy et al.

(10) Patent No.: US 9,451,745 B1
(45) Date of Patent: Sep. 27, 2016

(54) MULTI-BAND PHOTODIODE SENSOR

(71) Applicants: Susan A. O'Shaughnessy, Amarillo, TX (US); Steven R. Evett, Amarillo, TX (US); Martin A. Hebel, Makanda, IL (US); Paul D. Colaizzi, Amarillo, TX (US)

(72) Inventors: Susan A. O'Shaughnessy, Amarillo, TX (US); Steven R. Evett, Amarillo, TX (US); Martin A. Hebel, Makanda, IL (US); Paul D. Colaizzi, Amarillo, TX (US)

(73) Assignees: The United States of America, as represented by the Secretary of Agriculture, Washington, DC (US); Board of Trustees of Southern Illinois University, Carbondale, IL (US)

( * ) Notice: Subject to any disclaimer, the term of this patent is extended or adjusted under 35 U.S.C. 154(b) by 316 days.

(21) Appl. No.: 13/785,500

(22) Filed: Mar. 5, 2013

Related U.S. Application Data

(60) Provisional application No. 61/703,846, filed on Sep. 21, 2012.

(51) Int. Cl.
  *G01J 5/00* (2006.01)
  *A01G 9/24* (2006.01)
  (Continued)

(52) U.S. Cl.
  CPC .............. *A01G 25/167* (2013.01); *G01J 5/02* (2013.01)

(58) Field of Classification Search
  CPC .. G01N 21/00; A01C 21/005; H01L 27/146; G01J 5/00; A01G 9/24
  USPC ................... 374/120, 121, 130, 141, 100, 1; 250/338.1, 330, 331, 334, 346, 339.11, 250/339.04; 702/136, 130
  See application file for complete search history.

(56) References Cited

U.S. PATENT DOCUMENTS 2,848,626 A * 8/1958 Brackmann ................... 374/124
4,301,682 A * 11/1981 Everest ......................... 374/112
(Continued)

FOREIGN PATENT DOCUMENTS

EP           999600 A2  *  5/2000
JP         56014139 A   *  2/1981
(Continued)

OTHER PUBLICATIONS

O'Shaughnessy, Susan, "Wireless Makes Sense in Agriculture", The Wetting Front, Soil and Water Management Research Unit News, vol. 9, No. 2, Dec. 2007, pp. 1-12.
(Continued)

*Primary Examiner* — Gail Kaplan Verbitsky
(74) *Attorney, Agent, or Firm* — John D. Fado; Robert D. Jones

(57) ABSTRACT

Plant canopy temperature and multi-spectral reflectance are measured with a wireless multi-band sensor, and the temperature data are qualified and the spectral reflectance measurements are classified. The multi-band sensor includes sensors for measuring plant canopy temperature radiation and spectral reflectance over five bands, a microprocessor to receive and store measured data, and a wireless transmitter for transmitting data from the microprocessor to a remote receiver, all enclosed within a single housing. The data are used to detect variations in spectral signature due to plant stress (e.g., disease, water stress) and due to soil background and to qualify temperature data accordingly. The data provide information for decision support algorithms related to the initiation of automatic irrigation scheduling as a function of crop canopy cover, qualification of temperature data used in automatic irrigation scheduling algorithms, and detection of diseased crops for the purpose of withholding irrigations when yield potential is compromised.

8 Claims, 2 Drawing Sheets

(51) Int. Cl.
 *A01G 25/16* (2006.01)
 *G01J 5/02* (2006.01)

(56) References Cited

U.S. PATENT DOCUMENTS

| | | | | |
|---|---|---|---|---|
| 4,755,942 A | * | 7/1988 | Gardner | A01G 25/16 47/1.01 R |
| 4,876,647 A | * | 10/1989 | Gardner | A01G 25/16 700/284 |
| 5,392,611 A | * | 2/1995 | Assaf | A01G 9/246 237/81 |
| 5,539,637 A | | 7/1996 | Upchurch | |
| 6,212,824 B1 | * | 4/2001 | Orr | A01G 7/00 209/576 |
| 6,608,672 B1 | * | 8/2003 | Shibusawa et al. | 356/73 |
| 8,850,742 B2 | * | 10/2014 | Dube | A01G 7/045 47/17 |
| 8,924,031 B1 | * | 12/2014 | Evett et al. | 700/284 |
| 9,075,698 B2 | * | 7/2015 | Stachon | A01G 7/00 |
| 2004/0104346 A1 | * | 6/2004 | Devitt et al. | 250/339.14 |
| 2005/0098713 A1 | * | 5/2005 | Holland | G01J 3/10 250/221 |
| 2006/0054787 A1 | * | 3/2006 | Olsen et al. | 250/208.1 |
| 2008/0148630 A1 | * | 6/2008 | Ryan | A01G 7/045 47/17 |
| 2008/0291455 A1 | * | 11/2008 | Holland | G01J 3/10 356/445 |
| 2009/0302219 A1 | * | 12/2009 | Johnson | G01C 3/08 250/332 |
| 2010/0115830 A1 | * | 5/2010 | Dub | A01G 7/045 47/17 |
| 2010/0324830 A1 | * | 12/2010 | Solie | G01N 21/55 702/19 |
| 2011/0041399 A1 | * | 2/2011 | Stachon | A01G 7/00 47/58.1 LS |
| 2011/0260059 A1 | * | 10/2011 | Jiang et al. | 250/330 |
| 2012/0025080 A1 | * | 2/2012 | Liu et al. | 250/332 |
| 2012/0037803 A1 | * | 2/2012 | Strickland | 250/338.1 |
| 2012/0123817 A1 | * | 5/2012 | Hohenberger | G06Q 10/0631 705/7.12 |
| 2013/0067808 A1 | * | 3/2013 | Stachon | A01G 7/00 47/58.1 R |
| 2014/0012732 A1 | * | 1/2014 | Lindores | A01B 79/005 705/37 |
| 2014/0067745 A1 | * | 3/2014 | Avey et al. | 706/46 |
| 2014/0117252 A1 | * | 5/2014 | Craft | 250/458.1 |
| 2015/0068120 A1 | * | 3/2015 | Golgotiu | A01G 7/00 47/79 |
| 2015/0094917 A1 | * | 4/2015 | Blomme et al. | 701/50 |
| 2015/0173301 A1 | * | 6/2015 | Mahan | G01K 13/00 47/58.1 FV |
| 2015/0206255 A1 | * | 7/2015 | Groeneveld | G06Q 50/02 111/200 |
| 2015/0319934 A1 | * | 11/2015 | Stachon | A01G 7/00 47/58.1 R |
| 2015/0359183 A1 | * | 12/2015 | Green | A01N 25/00 504/292 |
| 2016/0050840 A1 | * | 2/2016 | Sauder | A01B 79/005 701/3 |

FOREIGN PATENT DOCUMENTS

| | | | |
|---|---|---|---|
| JP | 56014140 A | * | 2/1981 |
| JP | 2000150927 A | * | 5/2000 |
| JP | 2005151837 A | * | 6/2005 |

OTHER PUBLICATIONS

O'Shaughnessy, Susan A., et al., "Evaluation of a wireless infrared thermometer with a narrow field of view", Computers and Electronics in Agriculture, 76, 2011, pp. 59-68.

O'Shaughnessy, S.A. "Developing Wireless Sensor Networks for Monitoring Crop Canopy Temperature Using a Moving Sprinkler System as a Platform", Applied Engineering in Agriculuture, vol. 26(2), 2010, pp. 331-341.

* cited by examiner

MULTI-BAND PHOTODIODE SENSOR

CROSS-REFERENCE TO RELATED APPLICATIONS

This application claims the benefit under 35 U.S.C. 1.19(e) of U.S. provisional 61/703,846, filed Sep. 21, 2012, the contents of which are incorporated by reference herein.

BACKGROUND OF THE INVENTION

1. Field of the Invention

The invention is drawn to a method and apparatus for measuring plant canopy temperature and multi-spectral reflectance and managing irrigation.

2. Description of the Prior Art

Multi-band radiometers are optical sensors, typically consisting of two or more photodiode detectors or charge coupled devices, which produce electrical current that is proportional to the light energy to which they are exposed. The incoming light is filtered to a specific wavelength in the visible and near infrared ranges. These sensors are typically remote (as opposed to contact) sensors used as hand-held or vehicle-mounted instruments to remotely assess plant biophysical properties such as leaf area and ground cover (Vaesen et al., 2001, Field Crops Research, 69:13-25); crop nutrient status [Sui et al., 2005, Appl. Engr. Agric., 21(2): 167-172; Sui and Thomasson, 2006, Trans. of the ASABE, 49(6):1983-1991; Shanahan et al., 2008, Computers and Electronics in Agric., 61(1):51-62]; and biotic stress (Mirik et al., 2006, Computers and Electronics in Agric., 51:86-98). There are a number of commercialized multi-band radiometers including the Crop Circle (Holland Scientific, Inc., Lincoln, Nebr.), CropScan (Crop Scan Inc., Rochester, Minn.), FieldSpec (Analytical Spectral Devices, Boulder, Colo.), and GreenSeeker (Ukiah, Calif.). These multi-band sensors include photodetectors in the visible and NIR infrared range.

The primary method of remote water stress detection has been through the use of the thermal part of the spectrum [Barnes et al., 2000, Coincident detection of crop water stress, nitrogen status and canopy density using ground-based multispectral data (pdf file #13). In *Proc. 5th Intl. Conf. on Precision Agriculture and Other Resource Management*. Robert et al. eds. Madison, Wisc.:ASA-CSSA-SSSAJ]. Furthermore, thermal measurement observations obtained using remote sensors usually contain the temperatures of both vegetation and the soil background, particularly for row crops with partial cover. Colaizzi et al. [2003, J. Irrig. Drainage Engr., 129(1):36-43] used reflectance in the red and near-infrared bands to estimate fraction of vegetation cover within the field of view of an infrared thermometer. Since the soil is often a different temperature than the vegetation, it is important to distinguish the temperatures of each component when using thermal-based indices for irrigation automation.

The literature does refer to a multi-band radiometer, which incorporated a band in the thermal range. The handheld instrument was a sensor constructed by Robinson et al. (1979, Multiband radiometer for field research. Society of Photo-Optical instrumentation Engineers, Bellingham, Vol. 196, pp. 8-15) for research use. In a technical note, it was reported by Jackson and Robinson (1985, Remote Sensing Environ., 17:103-108) to be a hand-held eight band radiometer with a lithium tantalate detector as the thermal sensor with filtering properties in the range of 10.5-12.5 µm. However, the technical note did not address measurements concerning the thermal band. The second reference to a multi-band radiometer with a thermal detector concerned a multi-spectral sensor developed at the U.S. Arid Land Agricultural Research Center in Maricopa, Ariz. The sensor is part of a remote sensing package installed on a moving irrigation system and was discussed briefly by Barnes et al. (2000, ibid); Colaizzi et al. (ibid); and Haberland et al. [2010, Appl. Engr Agric., 26(2): 247-253]. Measurements from this sensor were used to refine nitrogen and water status indices for cotton and broccoli. Although this sensor contained four spectral bands in the green, red, red-edge, and NIR regions, the detector for the infrared thermal region was a physically separate sensor as shown in Haberland et al. (2010, ibid) and wired to a datalogger.

A functional wireless infrared thermometer (IRT) was developed separately (O'Shaughnessy et al., 2011, Computers and Electronics in Agric., 76:59-68) and 32 were deployed onto a six-span center pivot lateral as a wireless network system in a topology similar to that described by O'Shaughnessy and Evett [2010, Appl. Engr. in Agric. 26(2):331-341] for an earlier wireless IRT prototype. Measuring crop canopy surface radiometric temperature remotely using such an IRT has the disadvantage of also measuring soil background reflectance early in a growing season when crop canopy cover is limited, and possibly throughout the growing season in the case of row crop planting (for sensor view angles that are nadir or substantially parallel to crop rows), missing plants, and changing leaf architecture from loss of turgor pressure.

Identification of the presence of plant disease or pest infestation is typically manifested by changes in plant pigments that cause a drift in healthy canopy reflectance measurements. Diseases can mainly be detected in the yellow-red reflectance and with a lower NIR reflectance (Moshou et al., 2011, Biosystems Engr., 108:311-321). This deviation is detectable with multi-band photoactive sensors with bandwidth in the visible region between 470 and 670 nm and was used to detect the spread of wheat streak mosaic virus [Workneh, et al., 2009, Phytopathology 99(4):432-440] and pest infestation (Mirik et al., 2006, Computers and Electronics in Agric. 51:86-98) in winter wheat. Qin and Zhang (2005, International J. Applied Earth Observation., 7:115-128) used ratio indices from bands in the visible and NIR range to detect rice sheath blight.

Since all colors are made up of a combination of red (R), green (G) and blue (B), a sensor that is capable of filtering light in these three bands possesses flexibility in detecting color changes in crop canopy. Reflectance data are typically corrected relative to the changing angle of the sun. Another method to reduce variability from lighting changes is to normalize the reflectance data using an index that is relative to all three bands:

$$p_t = \left( \frac{P_t}{(R_t + G_t + B_t)} \right) \quad \text{eq. [1]}$$

where p is the normalized reflectance value, i.e. $p \in \{r, g, b\}$, P is the reflectance measurement from a photo active sensor and is an element of $\{R, G, B\}$, and t represents the measurement taken at time t.

Normalized spectral data are often classified into useful information using pattern recognition methods, which are derived from statistical techniques. A common technique is linear discriminant analysis used when the classes are assumed to have the same covariance. The classifying equation (Langrebe, 2003, Chapter 3. Pattern Recognition in Remote Sensing in Signal Theory Methods in Multispectral Remote Sensing. Hoboken, N.J.: Wiley & Sons, Inc. p. 91-111) can be represented by:

$$f_k(x_t) = (x_t - \mu_k)^T \sum_{k}^{-1} (x_t - \mu_k) \qquad \text{eq. [2]}$$

where $x_t$ is the sample vector ($r_t$, $g_t$, $b_t$) of class k taken at time t, $u_k$ is the mean vector of class k, and $\Sigma_k$ is the pooled covariance matrix of class k.

Korobov and Railyan (1993, Remote Sensing Environ. 43:1-10) used discriminant analysis to treat sets of spectral and plant measurements as dependent variables and derived correlations between pairs of linear combinations and phytometric variables such as plant height, plant density and percent cover. Miller and Delwiche [1991, ASAE. 34(6): 2509-2515] used linear discriminant analysis to categorize different types of peach surface defects using a radiometer with detectors filtering radiation in the 350 to 1200 nm range, and Wu et al. (1996, Analysis Chimica Acta, 329: 257-265) looked at differences in results between linear, quadratic, and regularized discriminant analysis to classify NIR data.

While images from satellites are available that do contain bands in the visible, NIR, and thermal infrared ranges, the advantage of ground-based spectral radiometers is that the user has the ability to control spatial and temporal resolution; additionally ground-based measurements are unaffected by cloud cover and atmospheric light filtering. Furthermore, because it is impractical to deploy wired sensors along a sprinkler lateral whose length is commonly a quarter-mile or longer, wireless sensing devices are needed to commercialize the integration of multi-band radiometers onto a moving sprinkler system (O'Shaughnessy and Evett, 2010, ibid).

A radiometer viewing a cropped surface will likely have both soil and vegetation in its field of view (i.e., sensor footprint). This is especially true for row crops early in the season before the crop canopy completely covers the soil. Furthermore, the soil and vegetation will contain both sunlit and shaded components. The sunlit and shaded components of soil and vegetation have different reflectance and radiometric temperature responses, which can be exploited to estimate crop biophysical characteristics (Fitzgerald et al., 2005, Remote Sens. Environ., 97:526-539). Also, most radiometers used in agricultural applications are deployed such that the cropped surface is viewed at an oblique angle, resulting in the sensor footprint having an elliptical shape. For row crops with partial cover, the proportion of vegetation appearing in a sensor footprint depends on the radiometer deployment height, distance to the crop row, zenith view angle, azimuth view angle relative to the crop row, crop canopy height, width, leaf area index, and canopy architecture (usually quantified in terms of a leaf angle distribution function; Campbell and Norman, 1998, An introduction to environmental biophysics. 2nd ed. Springer-Verlag, New York). Furthermore, the proportion of sunlit and shaded soil and vegetation depends on these factors and on the zenith and azimuth angles of the sun. However, leaf area index can be quantified using multi-band data (Vaesen et al., 2001, Field Crops Research, 69:13-25; Gitelson, 2004, J. Plant Physiology, 161:165-173). The normalized difference vegetative index (NDVI) developed by Rouse et al. (1973, Monitoring vegetation systems in the Great Plains with ERTS, Third ERTS symposium, NASA Sp-351I, 309-317) is often used to estimate leaf area index. The index ranges from near 0 to 1 and is calculated using equation 3:

$$NDVI = \frac{(NIR_\lambda - Red_\lambda)}{(NIR_\lambda + Red_\lambda)} \qquad \text{eq. [3]}$$

where reflectance in the NIR region ($NIR_\lambda$) was measured within the bandwidth of 790-970 nm, and reflectance in the red region ($Red_\lambda$) was measured within the 650-690 nm bandwidth. Values of NDVI closer to zero indicate more soil is viewed, and values nearer to unity indicate that vegetative cover is nearly complete or is complete.

However, despite these and other advances, the need remains for improved sensors for measuring plant canopy temperature and spectral reflectance, and algorithms to differentiate good or acceptable data from unacceptable data, address the influences of sunlit and shaded soil and canopy on temperature data, detect diseased crops, and manage irrigation.

SUMMARY OF THE INVENTION

We have invented a novel wireless multi-band sensor effective for measuring plant canopy temperature and multispectral reflectance, and a process to qualify the temperature data and classify the spectral reflectance measurements for use in irrigation management. The multi-band (i.e., multispectral) sensor of this invention comprises sensors for measuring radiation and spectral reflectance over five bands, a microprocessor to receive and store measured data from the sensors, and a wireless transmitter for transmitting data from the microprocessor to a remote receiver. A housing is provided, enclosing all of the sensors, microprocessor and wireless transmitter. The sensors of the device include an infrared thermometer effective for remotely measuring the temperature of a surface (e.g., plant canopy and/or soil), and photodiode detectors effective to individually measure filtered radiation in the near infra-red (NIR) band region (comprising 880±50 nm radiation), the red band region (comprising 685±10 nm radiation), the green band region (comprising 565±10 nm radiation), and the blue band region (comprising 450±40 nm radiation).

The invention also relates to a novel process to detect variations in spectral signature due to plant stress (e.g., disease, water stress) and due to soil background and to qualify temperature data accordingly. The data from the sensors provide information for decision support algorithms related to the initiation of automatic irrigation scheduling as a function of crop canopy cover, with the qualified temperature data used in automatic irrigation scheduling algorithms, and the detection of diseased crops for the purpose of withholding irrigations when yield potential is compromised.

In the process, temperature and spectral reflectance data (NIR, red, green and blue bands) are collected for each irrigation management zone (control area) and subsequently transmitted to a remote microprocessor-based computer control unit. The data for a first management zone are corrected for sun angle, and the spectral reflectance data are evaluated to determine if they were collected from soil or plant canopy. If the data are not classified as soil (i.e., the data were collected from plant canopy), the spectral reflectance data are evaluated to determine if the measured plant vegetation is diseased or healthy. If diseased, irrigation may be withheld. Conversely, if the measured plant vegetation is healthy, the temperature data are evaluated to determine if the measured plants are water-stressed. If the measured plants are water-stressed, irrigation is indicated and/or initiated. If the data collected above are classified as soil, the decision to irrigate may be at the option of the irrigation operator or grower. In a preferred embodiment, the multi-band sensors are mounted on a moving irrigation system, and the temperature and spectral reflectance data are collected multiple times as it passes over each irrigation management zone. In this embodiment, the evaluation of the corrected spectral reflectance data to determine if they were collected from soil or plant canopy comprises determining the ratio (an area-weighted ratio) of data from soil to data from plant canopy. If this ratio is greater than a predetermined threshold value (between 0 and 1), irrigation may be optionally withheld due to a lack of plant cover. The particular threshold value selected is variable, may be determined by the irrigation operator or grower in consideration of factors such as water availability and irrigation cost. Area weighting is applied if the speed of the irrigation system over the ground changes as the sensor passes over a management zone. This process is repeated for each management zone subject to irrigation for which data are collected.

In accordance with this discovery, it is an object of this invention to provide an improved stand-alone multi-band sensor having an infrared thermometer for measuring plant canopy temperature, photodiode detectors for measuring spectral reflectance in the NIR, red, green and blue bands, a microprocessor, algorithms embedded in firmware and wireless transmitter, all contained within a single integrated unit.

It is another object of this invention to provide an improved stand-alone multi-band sensor effective for measuring all of plant canopy temperature and spectral reflectance in the NIR, red, green and blue bands, storing the data in a microprocessor, and wirelessly transmitting the data to a receiver at a remote location.

It is also an object of this invention to provide an improved process for managing irrigation with reduced false positive irrigation scheduling and increased efficiency and cost efficacy of irrigation as it relates to successfully increasing plant yields per unit of water applied.

It is a further object of this invention to provide an improved process for managing irrigation wherein temperature data are qualified as originating from soil surface or plant canopy, diseased plants vs. healthy plants, and water-stressed plants vs. non-water-stressed plants.

Other objects and advantages of the invention will become readily apparent from the ensuing description.

DETAILED DESCRIPTION OF THE INVENTION

Figure 1:
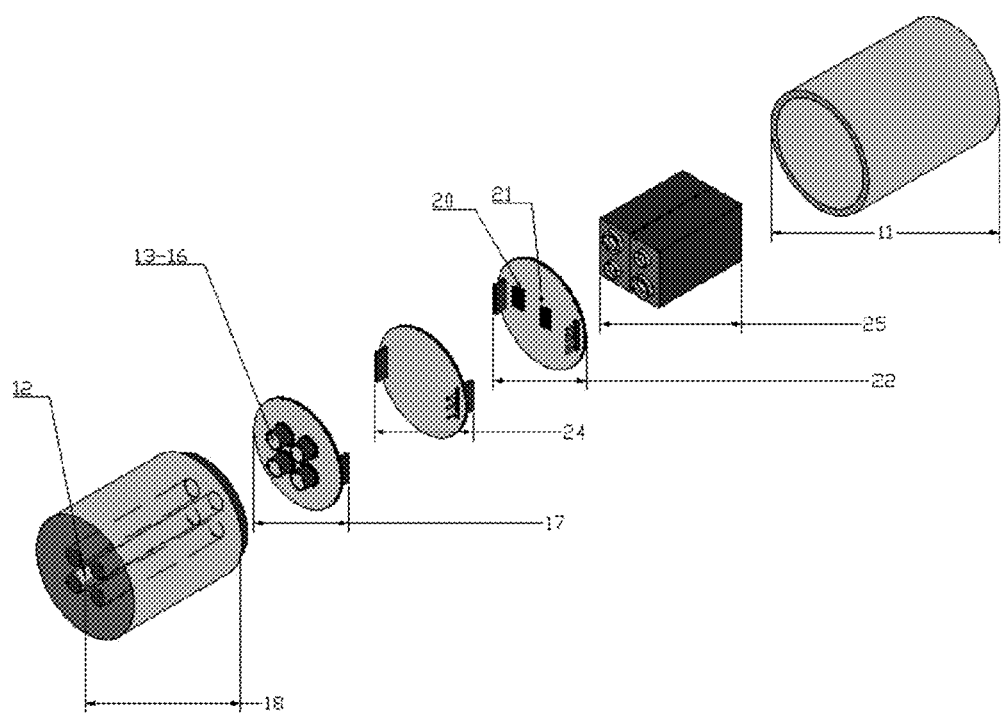
FIG. 1 shows a design of wireless five-band radiometer in accordance with a preferred embodiment.

The multi-band sensor described herein was designed as a single, self-contained unit with multiple detectors or sensors for making measurements of plant canopy temperature and spectral reflectance in the NIR, red, green and blue bands, storing the data in a microprocessor, and wirelessly transmitting the data to a receiver at a remote location. As shown in FIG. 1, the multi-band sensor includes a housing or casing (11) of sufficient size as to contain all of the components therein. The housing may be constructed from a variety of materials, but should be weather-proof to prevent damage to the detectors therein. In a preferred embodiment, the housing is constructed from two or more pieces of rigid sunlight resistant plastic for ease of access.

Plant canopy (or soil) surface temperature is effectively measured with an infrared thermometer or IRT (12), which is sensitive to infrared (IR) radiation in the thermal range, between about 5 to 14 µm. A variety of infrared thermometers are known in the art and are suitable for use herein, including those described by Wood and Scharf (U.S. Pat. No. 4,998,826) or O'Shaughnessy et al. (2011, Computers and Electronics in Agric., 76:59-68), the contents of each of which are incorporated by reference herein. In a preferred embodiment, the IRT comprises a thermal IR thermopile detector chip (5.5-14 µm) with an attached collimating filter/lens to reduce the field of view. A particularly preferred IRT for use herein is the model MLX90614-DCI IRT with a half-view angle of 5°, manufactured by Melexis (Leper, Belgium). A narrow field of view IRT is particularly preferred for measuring row crops at oblique angles when the multi-band sensors are mounted on a moving platform such as a moving irrigation system. Plant canopy spectral reflectance is effectively measured with four photodiode detectors (13-16), disposed on mounting board (17). The four detectors include a first photodiode effective for measuring surface reflectance within the near infra-red band region comprising 880±50 nm radiation, a second photodiode effective for measuring surface reflectance within the red band region comprising 685±10 nm radiation, a third photodiode effective for measuring surface reflectance within the green band region comprising 565±10 nm radiation, and a fourth photodiode effective for measuring surface reflectance within the blue band region comprising 450±40 nm radiation. Again, a variety of photodiode detectors are available commercially and are suitable for use herein. A collimator (18) or collimating lens is preferably positioned over the photodiode detectors to limit the collection of stray radiation from non-targeted plants or surroundings. As shown in FIG. 1, a preferred collimator comprises a thick disk with cylindrical holes providing collimation effective to reduce the field of view of the detectors to between about 2:1 to about 5:1, preferably about 4:1 (although narrower fields of view can be used), positioned within the housing or affixed to the end thereof.

A microprocessor unit (20) is provided in communication with the temperature and spectral reflectance detectors to receive, store and process data signals therefrom. Communication between the detectors and microprocessor may be affected using conventional interface hardware. In a preferred embodiment, the microprocessor is also effective to compute and store periodic time averages of the temperature and spectral reflectance measurements from each detector. The microprocessor may also function to convert analog data to digital form if necessary (if the sensor output is an analog signal), or this conversion may be conducted by a conventional analog/digital converter. A wireless transmitter (21) (a radio frequency or RF module) is provided in communication with the microprocessor to receive the stored data (or time averages) therefrom and transmit this data signal to a receiver at a remote location, such as a microprocessor-based computer control or data logger base station unit. The particular microprocessor and wireless transmitter used are not critical, and each may be obtained from commercial sources. However, without being limited thereto, wireless transmitters operating under the 802.15.4 IEEE open communication standard (Zigbee) are preferred. Each of the microprocessor and wireless transmitter are shown as mounted on board (22) disposed within housing (11). A conventional amplification and multiplex board (24) may be optionally provided for amplifying and multiplexing the data signals transmitted from the detectors to the microprocessor.

Power for operation of the detectors, microprocessor and wireless transmitter may be provided by electrical power supply (25), which may also be disposed within housing (11). A variety of power sources are suitable for use herein, although typically power will be supplied using onboard batteries, capacitors or combinations thereof. In a preferred embodiment, the power supply will include an optional solar cell or panels (not shown) to recharge the batteries. It is also understood that power may be provided by other conventional external sources, including generators, wind generators and AC electrical connections, or by less conventional sources including energy harvesting devices and wireless power transmission.

The multi-band sensor device may be used as a hand held sensor for measuring crop canopy temperature and spectral reflectance measurements. In this embodiment an optional satellite positioning system receiver (GPS module) may be provided to provide spatial information while transecting a cropped field. However, in a preferred embodiment, at least one but preferably a plurality of the sensors are disposed on a moving irrigation system or dispersed at stationary locations in the field to be irrigated to collect plant canopy (or soil) data in the desired control areas. Without being limited thereto, the IRT should have a field of view, e.g., between about 10 to 20°, to provide a spot size that includes a portion of the canopies of several plants but does not extend above the horizon and does not extend downward so as to include appreciable soil surface in the spot when mounted above the surface and aimed at a downward oblique angle (above 45° from horizontal), and should allow correction for ambient temperature conditions. In a preferred embodiment, two multi-band sensors are aimed at the control area from nearly opposite sides of the area in order to reduce sun angle effects on measured surface temperature.

In use, the multi-band sensors will typically operate continuously with data samples made at regular intervals. Although the data can be transmitted directly to the base station computer unit, in a preferred embodiment, time averaged values of the temperature and spectral reflectance from each band are computed and stored by the on-board microprocessor. The sampling frequency and data averaging frequency are not critical and may be selected by the user. By way of example, data may be collected every 5 to 15 seconds, and one minute averages from each band are computed and stored in the microprocessor. The time averaged values for each of the five bands are periodically transmitted to the base station computer or data logger. Sampling frequency, data management concerning temperature qualification, data averaging, and frequency of transmission to the base station computer or data logger are controlled with firmware coding. At the base station, the data are collected, time stamped, and corrected for sun angle effects, and analyzed. For automatic irrigation control applications, a microprocessor based computer control unit having conventional interface hardware is provided for receiving and interpreting the signals from the multi-band sensors. A suitable microprocessor will include hardware and/or software for recording plant canopy temperature and spectral reflectance measurements, and processing the calculations therefrom in accordance with the method described herein. As described in detail hereinbelow, vegetative index values derived from the surface reflectance measurements are used to indirectly categorize the measured surface material as soil, healthy vegetation or diseased vegetation. These vegetation indices are paired with the concurrent temperature measurements to classify the data in real time as representing soil surface or plant canopy temperature, a diseased or non-diseased plant, and a water-stressed or non-water-stressed plant. One or more signal generators may be provided in communication with the base station computer control unit microprocessor, which is effective for generating and displaying an irrigation signal when the plants are water-stressed and irrigation is indicated. Signals may include audible alarms, visible beacons, lights or LEDs, printouts or any combination thereof. Although irrigation may be manually actuated by the producer in response to the above-mentioned signals, the base station computer control unit may include optional control means for automatically actuating irrigation. Suitable control means should include appropriate electronic circuitry effective for actuating the particular irrigation device in response to the microprocessor, including transmission of variable rate irrigation instructions where irrigation application depth may be varied in time and space. In accordance with this embodiment, automatic control means may replace or be used in conjunction with the signal generator.

The multi-band sensor and process described herein may be used for collecting temperature and spectral reflectance data and managing irrigation or watering of a variety of plants, particularly agronomically important field crops, vegetables, fruits and fruit trees, turf grass, golf courses, urban landscapes and horticultural crops. Without being limited thereto, examples of plants which may be managed using this invention include sorghum, cotton, corn, wheat, beans, soybeans, peppers, cucumbers, tomatoes, potatoes, peach trees, orange trees, almond trees, pecan trees, olive trees, roses and petunias. It is also envisioned that the invention may be used in a variety of climates, with any production system or any type of irrigation system, including stationary irrigation systems and particularly field traversing irrigation systems such as a center pivot system. In addition to its application in arid and semi-arid regions, the invention may be used in non-arid or humid regions to identify the need for supplemental irrigation, or even for managing watering in greenhouses. Irrigation systems of particular interest which may be used with this invention include, but are not limited to, drip, sprinkler, LEPA [low energy precision application, as described by Lyle and Bordovsky (1981, Trans ASAE, 24:1241-1245), and Bordovsky and Lyle (1988, ASAE Paper no. 88-2097, ASAE, St. Joseph, Mich.), the contents of each of which are incorporated by reference herein], and flood irrigation.

Figure 2:
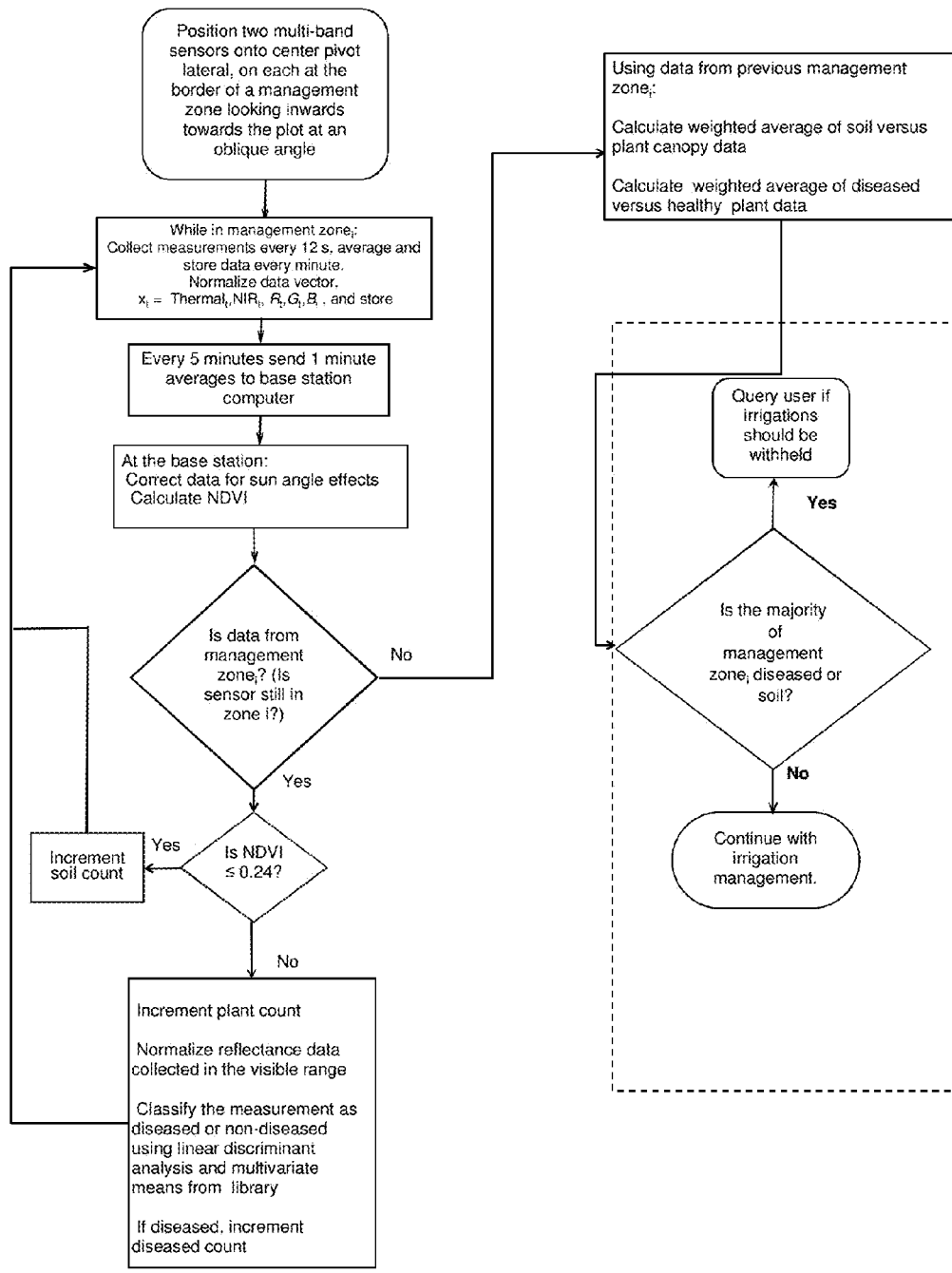
FIG. 2 shows an algorithm flowchart that combines the qualification of thermal measurements with disease detection for irrigation scheduling and control. This embodiment specifically illustrates the decision making process as sensors mounted on a moving irrigation system measure a management zone i.

A preferred embodiment of the process for the collection of temperature and spectral reflectance data, analysis of the data, and managing irrigation is shown in FIG. 2. In general, prior to irrigation control, a library of mean spectral reflectance measurements are prepared from soil (wet and dry) and from each species of crop of interest (healthy and diseased) and for each type of field sample type (soil) that may be viewed by the multi-band sensor in a field setting. These measurements are recorded multiple times over homogeneous samples. Each measurement made at time t from the multi-band sensor will produce a multidimensional vector (Thermal$_t$, NIR$_t$, R$_t$, G$_t$, and B$_t$) representing measurements from the thermal, near-infrared, red, green, and blue detectors. By way of example and without being limited thereto, averages of the data in the near-infrared and visible ranges are shown for measurements made while viewing homogeneous samples of wet and dry soil, green grass, and yellow sunflower blossoms with a prototype wireless multi-band sensor using a nadir looking view angle (Table 1). A normalized difference vegetative index (NDVI) is also generated for each of the homogeneous samples, including soil, using equation 3.

Table 1. Example library of average spectral reflectance measurements from homogeneous field samples.

| Sample description | Reflectance measurements (mV) | | | | |
| --- | --- | --- | --- | --- | --- |
| | NIR | R | G | B | NDVI |
| Wet soil (Pullman Clay Loam) | 541 | 331 | 88 | 112 | 0.24 |
| Dry Soil (Pullman Clay Loam) | 258 | 187 | 96 | 197 | 0.16 |
| Senesced Wheat (devoid of chlorophyll) | 193 | 151 | 77 | 143 | 0.12 |
| Sunflower blossoms | 275 | 95 | 120 | 71 | 0.48 |
| Green Vegetation | 625 | 80 | 38 | 72 | 0.61 |

Reflectance data in the visible range (R, G, B) are normalized using equation 1, and these multivariate means ($\overline{r}_t, \overline{g}_t, \overline{b}_t$) for each sample type are also stored in the library. An example library is shown in Table 2.

Table 2. Example library of multivariate means in the visible range for homogeneous samples of interest.

| Sample | $\overline{r}_t$ | $\overline{g}_t$ | $\overline{b}_t$ |
| --- | --- | --- | --- |
| Dry Soil | 0.352706 | 0.321529 | 0.3258 |
| Sunflower blossoms | 0.33251 | 0.417608 | 0.249878 |
| Green Vegetation | 0.25414 | 0.42278 | 0.322937 |

These libraries are used in the decision algorithm for irrigation control for each management control zone growing the selected plant or crop of interest. Using the multi-band sensor, temperature and spectral reflectance data (NIR, red, green and blue) are collected for each management control zone at a time, t. For each zone, the average stored data at that time, t, may be represented by the vector $x_t$=Thermal$_t$, $r_t$, $g_t$, $b_t$. These data are received at the base computer control station, and corrected for sun angle using bidirectional reflectance factors, such as described by Robinson and Biehl (1982, Calibration procedures for measurement of reflectance factor in remote sensing field research, LARS Technical Reports, Paper 93, the contents of which are incorporated by reference herein). However, it is understood that the calculations for the correction may be conducted by the microprocessor of the multi-band sensor. The NDVI is calculated from this data at time, t, using equation 3. The surface radiometric temperature datum, $T_s$(t) measured at time, t, is paired with the corresponding NDVI value (Eq. 3) calculated at time, t, NDVI(t), and compared to the previously determined NDVI for the soil type in the management zone. If NDVI(t)<=NDVI$_s$, (NDVI over soil), then $T_s$(t) will not be used in the mean calculation of crop canopy temperature and the management of irrigation. The data are discarded and further data from the management control zone of interest are analyzed as described above (the process is repeated). Conversely, if NDVI(t)>NDVI$_s$, then the data evaluation for that management area at that time, t, is continued to classify the plant or crop as diseased or healthy.

For example, NDVI measurements were made with 12 wireless multi-band sensors mounted on a center pivot sprinkler irrigating over wheat plots at variable rates in Bushland, Tex., in the course of a growing season. The NDVI$_s$ for the soil in these plots was previously determined as 0.24 (Table 1 and FIG. 2). The NDVI measurements showed a significant response to differing levels of soil background. Notably, NDVI measurements for DOY 123 (early in the season) varied from low values of 0.05-0.08 (indicating soil) to 0.63-0.79 (plant canopy), with 18 of 60 management zones identified as soil (NDVI of 0.22 or less). However, by DOY 144 (later in the season), many more management zones were identified as plant canopy with high NDVI measurements of up to 0.71-0.79, while only 4 of 60 management zones indicated soil (NDVI of 0.22 or less).

As described above, if NDVI(t)>NDVI$_s$, then the data evaluation for that management area at that time, t, is continued to classify the plant or crop as diseased or healthy. Using equation 2, the measured target is assigned to the class for which $f_k(x_t)$ (equation 2) is smallest. Multivariate means of each sample ($\mu_k$) are taken from the library of values (Table 2), and the covariance matrix is derived from the library data; $x_t$ is the normalized vector representing the measurement made at time t. A weighted average of diseased versus healthy plant data is calculated, and if the measurement is classified as diseased (a majority of the management zone data are indicated as diseased) then irrigation may be withheld. Again, if irrigation is withheld the data are discarded and data from the next management control zone of interest are analyzed as described above (the process is repeated). However, if a weighted average of diseased versus healthy plant data is classified as healthy (a majority of the management zone data are indicated as healthy), then $T_s$(t) will be used in the mean calculation of crop canopy temperature and the management of irrigation. Similarly, if a weighted average of data identified as soil versus plant cover surpasses a threshold value, then irrigation may be withheld due to lack of plant cover.

Once the data have been classified as representative of healthy (non-diseased) plants, the evaluation of the temperature data, $T_s$(t), is initiated to determine if the plants are water-stressed and irrigation is warranted. The determination if the plants are water-stressed or non-water-stressed based on plant canopy temperature, and the subsequent decision to indicate or initiate irrigation, may be conducted using a variety of techniques or algorithms. A number of techniques for control of irrigation based upon the determination of crop water stress have been previously described and are also suitable for use herein. However, in a preferred embodiment, the determination of water-stress and the irrigation signal generation or the initiation of irrigation are conducted using the process described by Evett et al. (U.S. patent application Ser. No. 13/403,091, filed Feb. 23, 2012, the contents of which are incorporated by reference herein.

It is understood that the foregoing detailed description is given merely by way of illustration and that modifications and variations may be made therein without departing from the spirit and scope of the invention.

We claim:

1. A method for managing the irrigation of plants comprising the steps of:
   a) providing the multi-band sensor in the vicinity of plants within a target control area subject to irrigation, the multi-band sensor comprising:
      1) an infrared thermometer effective for remotely measuring a surface temperature of a plant canopy or soil;
      2) a multi-photodiode array effective for measuring surface reflectance of a plant canopy or soil within the near infra-red, red, green, and blue regions, comprising the region from 880±50 nm to 450±40 nm, said surface reflectance being measured using ambient sunlight;
      3) a microprocessor in communication with and effective to receive and store measured data from said infrared thermometer, and said surface reflectance data from said multi-photodiode array;
   b) measuring and collecting surface temperature data for a plant canopy or soil at time (t) and designating the measured temperature $T_{surf}(t)$, and collecting spectral reflectance data in the near infrared, red, green and blue bands from said multi-band sensor for said target control area;
   c) transmitting said temperature data and spectral reflectance data to a remote microprocessor-based computer control unit;
   d) correcting said temperature data and spectral reflectance data for the sun angle at which it was collected;
   e) evaluating the corrected temperature data and spectral reflectance data to determine if they were collected from soil or plant canopy by calculating normalized difference vegetative index (NDVI) at time (t) to get NDVI(t), and identifying NDVI for a soil type in a target irrigation management zone to determine a value designated $NDVI_{soil}$, wherein if NDVI(t) is less than or equal to $NDVI_{soil}$, then corrected $T_{surf}(t)$ is not used to calculate said crop canopy temperature in evaluating the spectral reflectance data to determine if the plant canopy is diseased or healthy, and determine if the plant is diseased or healthy, and
      1) if the data are from a plant canopy, evaluating the spectral reflectance data to determine if the plant is diseased or healthy, if the plant is diseased, optionally withholding irrigation;
      2) if the plant is healthy, evaluating the temperature data to determine if the plant is water-stressed; and
      3) generating an irrigation signal for irrigation or automatically initiating irrigation if the plant is water-stressed.

2. The method of claim 1 wherein said temperature data and spectral reflectance data are collected multiple times within said target control area, and said evaluating the corrected temperature data and spectral reflectance data to determine if they were collected from soil or plant canopy comprises determining the ratio of data from soil to data from plant canopy, and if the ratio is greater than a predetermined threshold value, optionally withholding irrigation.

3. The method of claim 2 wherein said threshold value is between 0 and 1.

4. The method of claim 1 further comprising mapping a geographical area to be irrigated into two or more of said target control areas, and repeating said steps at each of said areas.

5. The method of claim 1 wherein said plants are selected from the group consisting of field crops, vegetables, fruits and fruit trees, turf grass, golf courses, urban landscapes and horticultural crops.

6. The method of claim 1 wherein said irrigation is provided using a controllable irrigation system.

7. The method of claim 1 wherein said irrigation is provided using a field-traversing irrigation system.

8. The method of claim 1 wherein said irrigation signal is an audible or visible signal.

* * * * *